(12) United States Patent
Inui et al.

(10) Patent No.: US 8,717,442 B2
(45) Date of Patent: May 6, 2014

(54) CALIBRATION INDEX FOR USE IN CALIBRATION OF ONBOARD CAMERA, METHOD OF ONBOARD CAMERA CALIBRATION USING THE CALIBRATION INDEX AND PROGRAM FOR CALIBRATION APPARATUS FOR ONBOARD CAMERA USING THE CALIBRATION INDEX

(75) Inventors: Yoji Inui, Ama-gun (JP); Mitsuyoshi Saiki, Nagoya (JP)

(73) Assignees: Aisin Seiki Kabushiki Kaisha, Aichi (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/203,928

(22) PCT Filed: Mar. 19, 2010

(86) PCT No.: PCT/JP2010/054764
§ 371 (c)(1),
(2), (4) Date: Aug. 30, 2011

(87) PCT Pub. No.: WO2010/113672
PCT Pub. Date: Oct. 7, 2010

(65) Prior Publication Data
US 2011/0310250 A1    Dec. 22, 2011

(30) Foreign Application Priority Data
Mar. 31, 2009    (JP) .................... 2009-085536

(51) Int. Cl.
*H04N 17/00*    (2006.01)

(52) U.S. Cl.
USPC ........................................... 348/175

(58) Field of Classification Search
USPC ......... 348/187, 188, 175, 177, 189, 176, 178, 348/148
See application file for complete search history.

(56) References Cited

U.S. PATENT DOCUMENTS 6,115,058 A * 9/2000 Omori et al. .............. 348/45
6,538,691 B1 * 3/2003 Macy et al. ............... 348/222.1
(Continued)

FOREIGN PATENT DOCUMENTS

JP    2001-116515 A    4/2001
JP    2001116515 A *  4/2001    ............ G01B 11/00
(Continued)

OTHER PUBLICATIONS

International Search Report of PCT/JP2010/054764, dated Jun. 29, 2010.
International Application No. PCT/JP2010/054765, filed Mar. 19, 2010, Aisin Seiki Kabushiki Kaisha.
U.S. Appl. No. 12/728,104, filed Mar. 19, 2010, Aisin Seiki Kabushiki Kaisha and Toyota Jidosha Kabushiki Kaisha.
U.S. Appl. No. 12/727,910, filed Mar. 19, 2010, Aisin Seiki Kabushiki Kaisha and Toyota Jidosha Kabushiki Kaisha.
(Continued)

*Primary Examiner* — Paulos M Natnael
(74) *Attorney, Agent, or Firm* — Sughrue Mion, PLLC

(57) ABSTRACT

For use in calibration of an onboard camera, there are provided a calibration index free of erroneous detection and a method of calibrating an onboard camera using such calibration index. The calibration index for use in onboard camera calibration includes a curved graphic formed of a curved line surrounding a predetermined region and a linear graphic comprising at least two straight lines forming an intersection point within the region surrounded by the curved graphic, the curved graphic and the linear graphic being formed in a same plane. A plurality of segments separated by the curved line forming the curved graphic and the straight lines forming the linear graphic are colored in a checkered pattern.

19 Claims, 4 Drawing Sheets

(56) References Cited

U.S. PATENT DOCUMENTS

| | | | |
|---|---|---|---|
| 7,808,525 B2* | 10/2010 | Katayama | 348/175 |
| 8,248,471 B2* | 8/2012 | Inui et al. | 348/148 |
| 8,294,771 B2* | 10/2012 | Ning | 348/188 |
| 2008/0036866 A1* | 2/2008 | Sogawa et al. | 348/187 |
| 2009/0067749 A1* | 3/2009 | Schiewe et al. | 382/294 |
| 2010/0245541 A1* | 9/2010 | Zhao et al. | 348/45 |
| 2011/0310250 A1* | 12/2011 | Inui et al. | 348/175 |
| 2012/0002057 A1* | 1/2012 | Kakinami | 348/187 |
| 2012/0007985 A1* | 1/2012 | Inui et al. | 348/148 |
| 2012/0033087 A1* | 2/2012 | Takeda et al. | 348/187 |

FOREIGN PATENT DOCUMENTS

| | | |
|---|---|---|
| JP | 2004-085325 A | 3/2004 |
| JP | 2006-245891 A | 9/2006 |
| JP | 2008-131177 A | 6/2008 |
| JP | 2008-131250 A | 6/2008 |

OTHER PUBLICATIONS

English Translation of International Preliminary Report on Patentability for PCT/JP2010/054764 dated Nov. 24, 2011.

* cited by examiner

CALIBRATION INDEX FOR USE IN CALIBRATION OF ONBOARD CAMERA, METHOD OF ONBOARD CAMERA CALIBRATION USING THE CALIBRATION INDEX AND PROGRAM FOR CALIBRATION APPARATUS FOR ONBOARD CAMERA USING THE CALIBRATION INDEX

CROSS REFERENCE TO RELATED APPLICATIONS

This application is a National Stage of International Application No. PCT/JP2010/054764 filed Mar. 19, 2010, claiming priority based on Japanese Patent Application No. 2009-085536 filed Mar. 31, 2009 the contents of all of which are incorporated herein by reference in their entirety.

TECHNICAL FIELD

The present invention relates to a calibration index for use in calibration of an onboard camera, a method of onboard camera calibration using the calibration index and a program for a calibration apparatus for an onboard camera using the calibration index.

BACKGROUND ART

In recent years, an increasing number of vehicles mount a camera to allow the driver of the vehicle to visually recognize a view laterally or rearwardly, etc. of the vehicle through a monitor unit mounted inside the vehicle. Further, there has been developed an apparatus for assisting a driving operation such as an operation for parking by effecting e.g. an image processing with utilization of a photographic image obtained by this camera. For the camera employed for obtaining photographic image as the basis for calculation of information such as positioning of the vehicle effected in such apparatus, particularly high precision in optical axis alignment is required. Such high optical axis alignment precision cannot be easily obtained at the time of the mounting of the camera and the high precision can be realized only through calibration of its optical axis with high precision after the mounting of the camera. As a technique for use in such calibration, one is known from Patent Document 1 identified below.

With a calibration apparatus for onboard camera described in Patent Document 1, within a field of view of the onboard camera, there is disposed a marker (a calibration index) having a black-and-white checkered pattern and a photographic image obtained by photographing this maker is subject to an image recognition operation for detection of a center point (calibration point) of the marker. This calibration apparatus effects calibration of an onboard camera with using the detected center point of the marker. This marker is provided with a colored checkered pattern and from an edge included in the photographic image obtained by the onboard camera, the calibration point formed by the checkered pattern is specified and this calibration point is used for effecting calibration of the onboard camera.

PRIOR ART DOCUMENT

Patent Document

Patent Document 1; Japanese Unexamined Patent Application Publication No. 2008-131250

SUMMARY OF THE INVENTION

Object to be Achieved by Invention

As described above, the onboard camera calibration disclosed in Patent Document 1 employs a calibration marker with a colored checkered pattern and a calibration point (the center point of the calibration marker) is detected based on an edge included in the calibration marker. However, such onboard camera calibration is effected generally inside a factory and inside such factory there exist many objects such as walking lanes delimiting an area where a worker can walk, white lines, fences. These walking lanes, white lines, fences, etc. are comprised mainly of linear graphics, thus inviting the risk of erroneous detection of straight lines used in the calibration marker.

In view of the above, the object of the present invention is to provide, for use in such onboard camera calibration, a calibration index (marker) free of erroneous detection and a method of calibrating an onboard camera with using such calibration index.

Means for Achieving the Object

For accomplishing the above-noted object, a calibration index of the present invention for use in calibration of an onboard camera is characterized in that the calibration index comprises a curved graphic formed of a curved line surrounding a predetermined region and a linear graphic comprising at least two straight lines forming an intersection point within said region surrounded by the curved graphic, said curved graphic and said linear graphic being formed in a same plane; and a plurality of segments separated by the curved line forming the curved graphic and the straight lines forming the linear graphic are colored in a checkered pattern.

With the above-described characterizing feature, on the site for effecting onboard camera calibration, the region surrounded by a curved graphic having no or few similar graphics present on the site is detected and then the two straight lines within this surrounded region are detected for specifying (identifying) the calibration point. Therefore, erroneous detection of calibration index can be avoided. Further, since the checkered pattern allows easy detection of border in the image recognition, calculation load imposed on the calibration apparatus can be alleviated. Therefore, together with alleviation of the calculation load, the detection precision of the calibration point specified by the calibration index can be enhanced at the same time.

Preferably, said curved graphic and said linear graphic each is surrounded by a further graphic having a different contour.

With the above-described arrangement, the coloring of the checkered pattern can be effected with inclusion of regions around the curved graphic and the linear graphic. Therefore, the detection precision of the calibration point can be further enhanced and the erroneous detection of the calibration index can be avoided even more effectively.

Still preferably, the straight lines forming the linear graphic are provided with an inclination relative the horizontal plane in the field of view of the onboard camera and a vertical plane vertical relative to said horizontal plane.

With the above-described calibration arrangement, in the photographing by the onboard camera, the length of the borderline formed by the two intersecting straight lines can be short, regardless of the position and/or angle of the onboard camera. Therefore, the detection precision of the straight lines can be enhanced and the precision in the detection of the calibration point as the intersection point of these straight lines can be improved.

Still preferably, said two straight lines have an angle of approximately 45 degrees relative to said horizontal plane and said vertical plane and formed perpendicular to each other.

With the above-described calibration arrangement, since an object or objects having an angle of approximately 45 degrees is/are existent less likely on the site for effecting the onboard camera calibration, the detection precision of the calibration point can be even further enhanced.

According to a method of calibrating an onboard camera relating also to the present invention, the method comprises:

a photographing step for photographing a pair of calibration indices with an onboard camera, said calibration indices being disposed in a pair spaced apart from each other and in opposition to the onboard camera;

an image receiving step for receiving a resultant photographic image and storing this image at a storing section;

an edge detecting step for detecting an edge included in the photographic image stored at said storing section;

a curved graphic detecting step for detecting the curved graphic based on the detected edge;

a linear graphic detecting step for detecting the linear graphic;

a calibration point setting step for detecting an intersection point in the detected linear graphic and setting said intersection point as a calibration point for use in the calibration of the onboard camera, based upon said intersection point and said curved graphic; and a correction camera parameter calculating step for correcting a displacement or an error in the optical axis present when the onboard camera was mounted on a vehicle, based upon a pair of set point which correspond respectively to a pair of calibration points set from the pair of calibration indices and which are set in advance in correspondence with the mounting position of the onboard camera.

With the above-described method, a calibration point specified by the calibration index can be detected in a reliable manner and with using this calibration point, appropriate calibration of the onboard camera is made possible.

Further, the present invention claims a scope for protection on a program suitably used in the calibration apparatus constituting the onboard camera with using the inventive calibration index described above. This program is characterized by computer-executed functions of:

a photographing function for photographing a pair of calibration indices with an onboard camera, said calibration indices being disposed in a pair spaced apart from each other and in opposition to the onboard camera;

an image receiving function for receiving a resultant photographic image and storing this image at a storing section;

an edge detecting function for detecting an edge included in the photographic image stored at said storing section;

a curved graphic detecting function for detecting the curved graphic based on the detected edge;

a linear graphic detecting step for detecting the linear graphic;

a calibration point setting function for detecting an intersection point in the detected linear graphic and setting said intersection point as a calibration point for use in the calibration of the onboard camera, based upon said intersection point and said curved graphic; and a correction camera parameter calculating function for correcting a displacement in the optical axis if any present when the onboard camera was mounted on a vehicle, based upon a pair of set point which correspond respectively to a pair of calibration points set from the pair of calibration indices and which are set in advance in correspondence with the mounting position of the onboard camera.

Such program for a calibration apparatus too can achieve the above-described advantageous function/effect and can be provided with the above-described additional features as described in the onboard camera calibrating method relating to the present invention.

MODES OF EMBODYING THE INVENTION

Next, a mode of embodying the present invention will be described in details. An onboard camera 20 to be mounted in a vehicle 100 is used for obtaining a rear view image of the vehicle 100 which is utilized in e.g. reverse traveling or assisting a parking operation by a user. Such rear view image is obtained as a photographic image from the onboard camera 20, but this image is used also for calculation using an image recognition operation for obtaining a distance between the vehicle 100 and an obstacle included in the photographic image. However, if the optical axis of the onboard camera 20 is deviated from a set value (e.g. a designed value) which is set in advance, an error or difference can occur between the result obtained by calculation and an actual distance. In such a situation, if the vehicle 100 is allowed to travel based on the above calculation, the vehicle may collide the obstacle.

In view of the above, a calibration of the optical axis is effected in a factory after mounting of the onboard camera 20 to the vehicle 100. A calibration index 10 relating to the present invention is for use when such calibration of the onboard camera 20 is effected in a factory. Next, explanation will be made with reference to the accompanying drawings. By the way, the calibration of the onboard camera 20 in this embodiment is not calibration of changing the physical position (i.e. a position in the real space) of the onboard camera 20, but calibration (or correction) by means of calculation of a displacement (or error) in the current position of the optical axis of the onboard camera 20 based on a difference if any between the disposing position, angle of the like of the onboard camera 20 and a preset value thereof.

Figure 1:
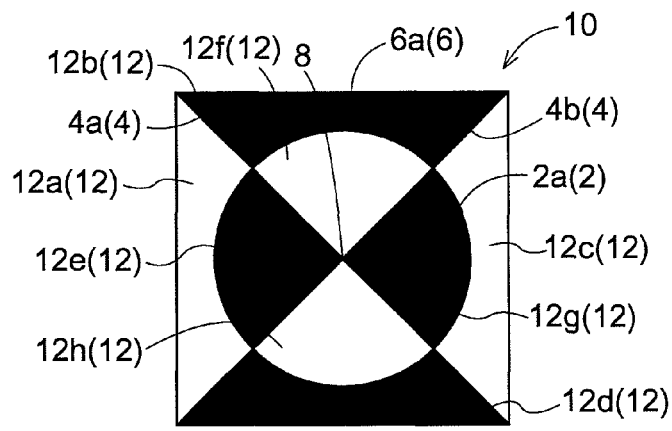
FIG. 1 a view showing a calibration index relating to an embodiment of the present invention, FIG. 2 a view showing positional relationship between a vehicle and the calibration indices, FIG. 3 a block diagram schematically showing a calibration apparatus for an onboard camera for effecting calibration of an onboard camera with using the calibration index relating to the present embodiment, FIG. 4 a view showing an example of a calibration index relating to a further embodiment of the present invention, FIG. 5 a view showing an example of a calibration index relating to a further embodiment of the present invention, FIG. 6 a bird's eye view showing positional relationship between a calibration index and a vehicle relating to a further embodiment of the present invention, and FIG. 7 a view showing an example of a calibration index relating to a further embodiment of the present invention.

FIG. 1 is a view showing a calibration index 10 relating to the instant embodiment. The calibration index 10 consists essentially of a curved graphic 2, a linear graphic 4 and a contour graphic 6, with these graphics being formed in a common plane. The curved graphic 2 is formed of a curved line that surrounds "a predetermined region". This predetermined region is not particularly limited, but can be any region surrounded by a curved line. In the case of the calibration index 10 shown in FIG. 1 for instance, a circle 2a corresponds to this curved graphic 2. Therefore, in the present embodiment, the curved line corresponds to the circle 2a surrounding a predetermined region. Incidentally, in the case of using the circle 2a, the concept of "a curved line surrounding a predetermined region" can be readily understood as a single closed curved line (a closed curve). Though will be detailed later, the curved line surrounding a predetermined region is not limited to such single closed curved line.

The linear graphic 4 comprises at least two straight lines that form an intersection point within the predetermined region surrounded by the curved graphic 2. As described above, the region surrounded by the curved graphic 2 corresponds to the region surrounded by the circle 2a. In the case of the calibration index 10 shown in FIG. 1, the linear graphic 4 corresponds to two straight lines 4a, 4b. Here, the linear graphic 4 included in the inventive calibration index 10 can be at least two lines. Hence, the following explanation of the present embodiment will be based on the assumption that the linear graphic 4 comprises two lines. Such two straight lines 4a, 4b are arranged in such a manner as to intersect within the region surrounded by the circle 2a, thus forming an intersection point 8.

Further, the straight lines 4a, 4b forming the linear graphic 4 are provided with an inclination or an angle relative to the horizontal plane in the field of view of the onboard camera 20 and also relative to the vertical plane vertical relative to this horizontal plane. For instance, as shown in FIG. 1, the two straight lines 4a, 4b are provided to form an angle of about 45 degrees relative to the horizontal plane and the vertical plane and also to intersect each other.

The contour graphic 6 is arranged such that the curved graphic 2 and the linear graphic 4 are surrounded by "a graphic having a different contour". In the instant embodiment, such graphic having a different contour corresponds to a quadrangle 6a. Therefore, the contour graphic 6 is arranged such that the curved graphic 2 and the linear graphic 4 are surrounded by the quadrangle 6a.

Further, a plurality of segments 12 that are surrounded by the contour graphic 6 and separated (sectioned) from each other by the curved line forming the curved graphic 2 and the straight lines 4a, 4b forming the linear graphic 4 are colored in a checkered pattern. The language "checkered pattern" refers so coloring of segments adjacent each other and separated by a line therebetween with different colors (in this embodiment, two colors of black and white). In this embodiment, the contour graphic 6 is the quadrangle 6a as described above. That is, the language "being surrounded by the contour graphic 6" means being surrounded by the quadrangle 6a. Further, the curved graphic 2 is the circle 2a. Hence, the curved line forming the curved graphic 2 corresponds to the curved line forming the circle 2a. Therefore, the segments 12 surrounded by the contour graphic 6 and separated by the curved line forming the curved graphic 2 and the straight lines 4a, 4b forming the linear graphic 4 correspond to the segments 12 that are surrounded by the quadrangle 6a and separated (sectioned) from each other by the circle 2a and the straight lines 4a, 4b. In FIG. 1, the segments 12 comprises eight (8) segments 12a-12h. And, these segments 12a-12b are colored in the checkered pattern so that each adjacently paired segments have different colors from each other as shown in FIG. 1. This checkered pattern is not particularly limited, but can suitably be a combination of any colors of distinct shading such as the combination of black and white or red and blue. Coloring of combination of any other colors is possible as a matter of course.

The calibration index 10 constructed as above will be used by being photographed by the onboard camera 20. Details of this will be described later. Then, a photographic image thereof obtained by this photographing is subject to an image processing, whose result is used for calibration of the onboard camera 20. Therefore, the calibration index 10 should have a size suitable for such use. For instance, one side of the quadrangle 6a constituting the contour graphic 6 is preferably 400 mm approximately.

Figure 2:
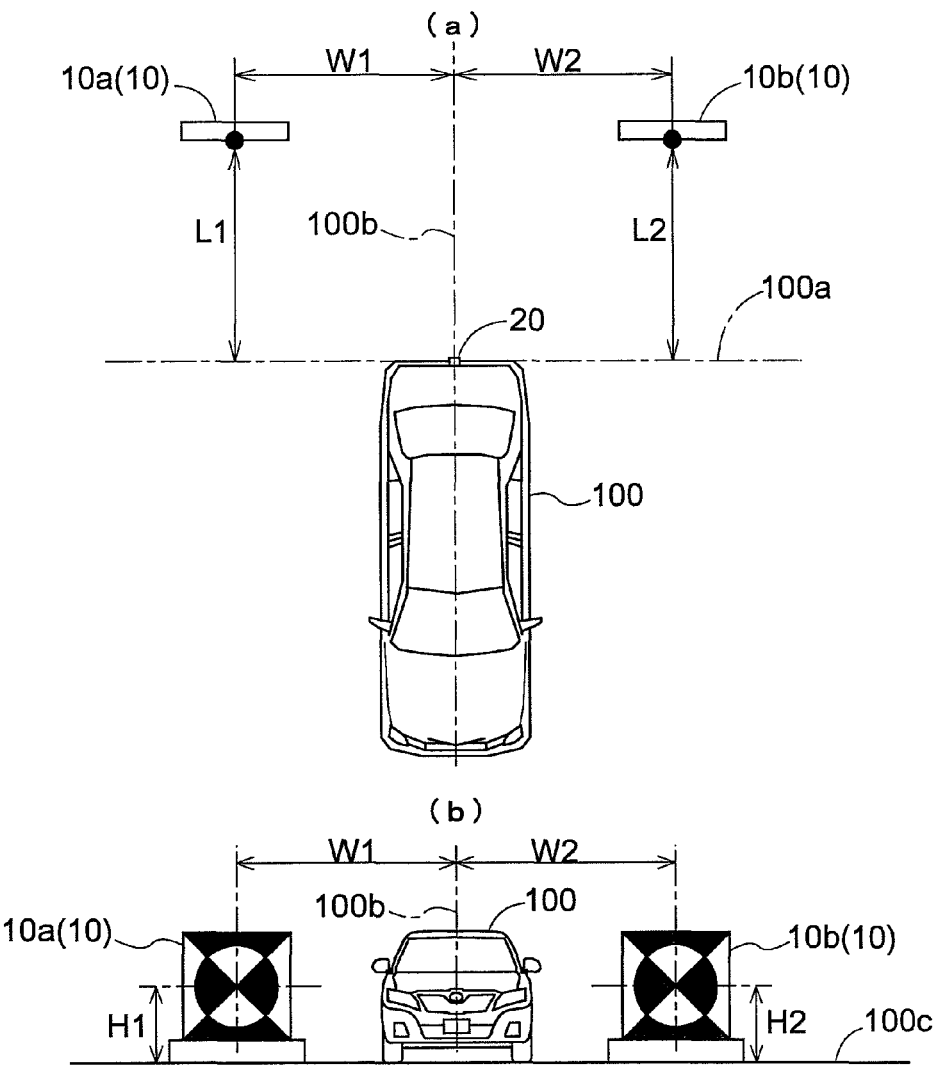

Next, a method of calibrating the onboard camera 20 with using the calibration index 10 relating to the present embodiment will be described. FIG. 2(a) is a bird's eye view showing positional relationship between the vehicle 100 and the calibration indices 10. FIG. 2(b) is an elevation showing the positional relationship between the vehicle 100 and the calibration indices 10. In this case, the onboard camera 20 is a rear view camera for capturing an image of the view rearwardly of the vehicle 100. As shown in FIG. 2(a), such onboard camera 20 is mounted adjacent a license plate attached to an outer rear portion of the vehicle 100 or adjacent an emblem attached to an outer rear portion of the vehicle 100, etc. Incidentally, in FIG. 2, for more clear showing of the calibration indices 10 relating to the present invention, the illustration is made, disregarding the actual dimensional ratio between the vehicle 100 and each calibration index 10.

The calibration indices 10 are disposed in opposition to the onboard camera 20 and spaced apart from each other. That is, as shown in FIG. 2(a) and (b), two indices 10 are disposed within the field of view of the onboard camera 20. More particularly, such calibration indices 10, as a pair of calibration indices 10a, 10b, are disposed in a virtual plane such that perpendicular distances thereof from a linear extension of a rear end face 100a of the vehicle 100 are predetermined distances L1, L2, respectively. For instance, preferably, the indices are disposed like erect panels or screens. Further, the calibration indices 10a, 10b are disposed to be spaced apart from each other. In this embodiment, the calibration indices 10a, 10b are disposed with the centers thereof having distances W1, W2 from the centerline 100b of the vehicle 100. Further, the calibration indices 10a, 10b are disposed with distances H1, H1 between centers thereof and a floor surface 100c on which the vehicle 100 is parked.

When calibration of the onboard camera 20 is to be effected, the calibration indices 10a, 10b are arranged in the manner described above. Incidentally, the distances W1 and W2, the distances L1 and L2 and the distances H1 and H2 can each pair have a same value or different values. And, with using such calibration indices 10, the calibration points can be detected without error when the calibration of the onboard camera 20 is effected.

Figure 3:
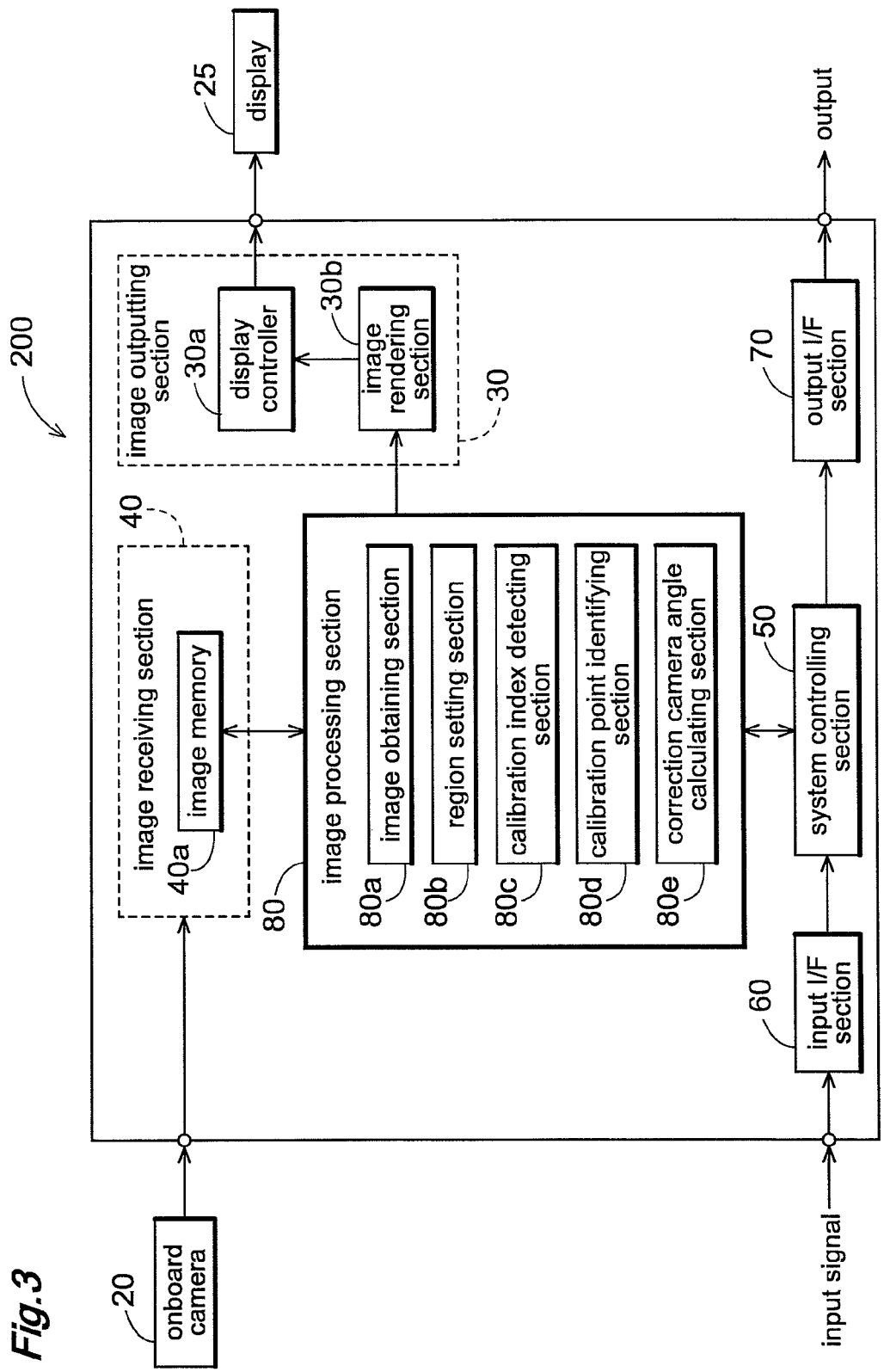

FIG. 3 is a functional block diagram schematically showing the construction of a calibration apparatus 200 capable of effecting calibration of the onboard camera 20 using the inventive calibration index 10. The calibration apparatus 200 includes, as the functional sections thereof, an image receiving section 40, an image outputting section 30, a system controlling section 50, an input I/F (interfacing) section 60, an output I/F section 70, and an image processing section 80. The calibration apparatus 200 constructed as above includes a CPU as its core hardware component and the above-described functional sections constructed of software and/or hardware.

The image receiving section 40 is configured to receive a photographic image photographed and obtained by the onboard camera 20 from the pair of calibration indices 10*a*, 10*b* and store it at a storing section 40*a*. In this embodiment, an image memory 40*a* functions as the storing section 40*a*. Therefore, the image receiving section 40 stores the photographic image obtained by the onboard camera 20 at the image memory 40*a*. Here, the step of photographing the calibration indices 10*a*, 10*b* by the onboard camera 20 will be referred to as "a photographing step". The step of receiving the photographic image obtained by the photographing step and storing them at the image memory 40*a* will be referred to as "an image receiving step".

The image outputting section 30 includes a display controller 30*a* and an image rendering section 30*b* and is configured to generate video signals for displaying photographic image on the display 25 or the like. The image rendering section 30*b* renders (i.e. draws) image of e.g. results of checking of calibration precision based on results of image processing to be described later, in a superimposing manner. The display controller 30*a* outputs the video signals with overlapping the superimposing on the photographic image.

The input I/F section 60 receives input signals for e.g. instructing initiation of calibration of the onboard camera 20, from a system in a higher level than the calibration apparatus 200 of the invention and then transmits these signals to the system controlling section 50. In the above, "a system in a higher level" refers to e.g. a system for adjusting assembly of vehicles 100, a back monitoring system for the vehicle 100, etc. The system controlling section 50 controls the calibration apparatus 200 as a whole and controls e.g. the image processing section 80 or the like based upon an instruction for initiating calibration to be described later. The output I/F section 70 is configured to receive e.g. the result of image processing via the system controlling section 50 and outputs output signals to the upper-level system described above.

The image processing system 80 includes an image receiving step section 80*a*, a region setting section 80*b*, a calibration index detecting section 80*c*, a calibration point identifying section 80*d*, and a correction camera angle calculating section 80*e*. Upon receipt of a calibration instruction from the above-described system controlling section 50, the image obtaining section 80*a* receives photographic image corresponding to this instruction from the image memory 40*a*.

The region setting section 80*b* calculates, for each one of the calibration indices 10*a*, 10*b*, a calibration index presence region where the calibration index is estimated to be present, based on the known mounting position of the onboard camera 20, the set value of the mounting angle of the onboard camera 20, and displacement or error, if any, in the mounting angle of the onboard camera 20, and sets an image processing area for each one of the calibration indices 10*a*, 10*b*.

The calibration index detecting section 80*c* detects the curved graphic 2 constituting the calibration index 10*a*, 10*b*, based on an edge (contour line) of the image processing region set by the region setting section 80*b*. This detection is effected in the order of an edge detecting step and a curved graphic detecting step. Next, these respective steps will be described.

At the edge detecting step, an edge contained in the photographic image stored at the image memory 40*a* is detected. In this, an image processing region is set by the region setting section 80*b* as described above. At the edge detecting step, an edge detection is effected with using an edge filter on the above image processing region. This edge detection is a known technique, so detailed discussion thereof will be omitted herein. However, in order to enhance the detection precision, it is advantageous to effect a horizontal scanning and a vertical scanning on the image processing region. An edge detected by the edge detecting step comprises a group of dots representing the edge, thus being referred to as "an edge dot group".

At the curved graphic detecting step, the curved graphic 2 is detected based on the detected edge. In this embodiment, the curved graphic 2 is a circle 2*a*. Therefore, at the curved graphic detecting step, the circle 2*a* is detected based on the edge detected by the edge detecting step. In this, the circle 2*a*, even a true circle in its front view, may appear as a shape similar to an ellipse in the photographic image, depending on the relationship between its photographed position and the position of the onboard camera 20. Therefore, at the curved graphic detecting step, the detection of the circle 2*a* is carried out with using a method for detecting an ellipse. Such ellipse detecting method, in this embodiment, there is employed an ellipse-fitting technique by RANSAC (Random Sample Consensus). As the RANSAC technique is a known technique, this will be explained only briefly in the following.

Firstly, from an edge dot group representing an edge detected by the edge detecting step, five dots will be chosen randomly. Next, the process calculates a formula of an ellipse that extends or passes through the chosen five dots and this is set as an ellipse model. Then, the process evaluates to what degree the other dots of the edge dot group than the five dots employed in the ellipse model setting fit this ellipse model (fitting degree evaluation). These operations, i.e. choosing of five dots, setting of an ellipse model and a fitting degree evaluation, are effected in repetition. On the results of these repeated operations, an ellipse which is defined by an ellipse model found most fitting (having the highest fitting degree) is determined as the graphic represented by this edge dot group. By the curved graphic detecting step described above, the curved graphic 2 is detected.

The calibration point identifying section 80*d* detects two straight lines from the edge dot group present within the ellipse fitted by the curved graphic detecting step and detects the intersection point of these detected straight lines as the calibration point. This detection is effected in the order of a distortion correcting step, a linear graphic detecting step and a calibration point setting step. Next, these respective steps will be described.

At the distortion correcting step, distortion if any in the photographic image is corrected. The photographic image is obtained by the onboard camera 20 in the manner described above, however, the photographic image immediately after photography ("the raw photographic image" hereinafter) includes some distortion due to lens distortion inherent in the lens of the onboard camera 20. For instance, even when a photographic object is linear in shape, this object may appear curved with distortion in the raw photographic image. For this reason, in order to correctly display not only a linear shape but also the photographic object, a correcting operation is effected. In this embodiment, in order to alleviate the calculating operation load, a correction is made on distortion in the edge dot group present within the region surrounded by the curved graphic 2 detected by the edge detecting step, as the detection target of the linear graphic. As the distortion correction per se is a well-known technique, detailed explanation thereof will be omitted herein.

The linear graphic detecting step detects linear graphics 4 present in the region surrounded by the detected curved graphic 2. Namely, the layout relationship between the curved graphic 2 and the linear graphics 4 in the calibration index 10 is known in advance; hence, the calibration apparatus 200 effects detection of the linear graphics 4 based on this known layout relationship. In the above, the language "the layout relationship is known in advance" can refer to a simple layout relationship (e.g. a layout relationship of being included in a closed curved line) or can also refer to a relative positional relationship defined by predetermined numeric values. Also, the detected curved graphic 2 means the curved graphic 2 after the above-described distortion correcting operation. Also, in the instant embodiment, the linear graphic 4 comprises the two straight lines 4a, 4b. Therefore, in the instant embodiment, the detection is effected for the two straight lines 4a, 4b present within the region surrounded by the curved graphic 2 after the distortion correcting operation. With this arrangement, the area for searching the straight lines 4a, 4b can be limited, so that the calculation cost can be reduced and at the same time reliable detection is made possible, advantageously.

At this linear graphic detecting step too, like the above-described curved graphic detecting step, the RANSAC technique is employed. Next, this will be explained briefly.

First, the detection of one straight line 4a is effected. Two dots are chosen randomly from the edge dot group which has undergone the distortion correcting operation and these are set as a linear model. Then, the process evaluates to what degree the other dots of the edge dot group than the two dots employed in the linear model setting fit this linear model (fitting degree evaluation). These operations, i.e. choosing of two dots, setting of a linear model and a fitting degree evaluation, are effected in repetition. On the results of these repeated operations, a straight line which is defined by a linear model found most fitting is determined as the one straight line 4a.

Next, detection of the other straight line 4b is effected. Here, in the detection of the other straight line 4b, of the edge dot group which has undergone the distortion correcting operation, the operation is effected on the remaining edge dot group from which the edge dot group that was used in the determination of the one straight line 4a. Firstly, two dots are randomly chosen from the edge dot group of interest. Next, the process calculates a formula of a straight line that extends or passes through the chosen two dots and this is set as a linear model. Then, the process evaluates to what degree the other dots of the edge dot group than the two dots employed in the ellipse model setting fit this linear model (fitting degree evaluation). These operations, i.e. choosing of two dots, setting of a linear model and a fitting degree evaluation, are effected in repetition. On the results of these repeated operations, a straight line which is defined by a linear model found most fitting is determined as the other straight line 4b. With these linear graphic detecting steps, the linear graphics 4 are detected.

At the calibration point setting step, the intersection point of the linear graphics 4 is detected and this intersection point is set as the calibration point for use in calibration of the onboard camera 20. The detected linear graphics 4 mean the two straight lines 4a, 4b detected at the above-described linear graphic detecting step. Hence, at the calibration point setting section, the intersection point of the two straight lines 4a, 4b is detected and this intersection point is set as the calibration point. In this way, the calibration point identifying section 80d sets the calibration point for use in calibrating the onboard camera 20.

The correction camera angle calculating section 80e calculates corresponding points corresponding to the right and left calibration points in a virtual image, based upon the known mounting position of the onboard camera 20, the set value of the mounting angle of the onboard camera 20 and the disposing positions of the calibration indices 10a, 10b and then calculates correction camera parameters based upon differences from the calibration points set by the calibration point identifying section 80d. This calculation is effected in a correction camera parameter calculating step. Incidentally, the correction camera parameter means a difference between a set value and an actual value in the camera parameter. Therefore, correcting the set value by the correction camera parameter is equivalent to correcting it to the actual value. This will be explained next.

The correction camera angle calculating step calculates a correction camera angle for correcting any displacement or error in the optical axis which may be present at the time of mounting of the onboard camera 20 to the vehicle 100, based upon a pair of set points which correspond to the pair of calibration points set from the pair of calibration indices and set in advance according to the mounting position of the onboard camera 20 and a pair of calibration points included in the photographic image. In the above, "a pair of set points which correspond to the pair of calibration points set from the pair of calibration indices and set in advance according to the mounting position of the onboard camera 20" correspond to a pair of corresponding points corresponding to the right and left calibration points on the virtual image. Then, differences between this pair of corresponding points and the pair of calibration points are calculated and then, based upon these differences, there is calculated a correction camera angle for correcting any displacement or error in the optical axis which may be present at the time of mounting of the onboard camera 20.

The correction camera angle is utilized for correction of the angle of the onboard camera 20. In this case, this correction camera angle is advantageously used in superposing a predetermined image on the photographic image (e.g. an anticipated traveling path anticipating a traveling path of the vehicle 100 used in a known parking assist apparatus or a driving assist apparatus, etc. for assisting a driver's operation for parking the vehicle 100 at a parking space or reversing the vehicle). That is, if the angle of the onboard camera 20 is displaced from the set value, when the photographic image from this onboard camera 20 and an image rendered by the set value are superposed, there occurs a displacement between the photographic image and the rendering image, which leads to the driver's erroneous recognition. In such case, based on this correction camera angle, the rendering image is corrected to be suitable for the actual photographic image (photographic image photographed by the onboard camera 20 set with such the camera angle displaced from the set value). Therefore, it becomes possible to superpose the predetermined rendering image precisely on the photographic image obtained by the onboard camera 20.

Further, the correction camera angle can be utilized for calculating an angle for correcting the angle of the onboard camera 20 and correcting the photographic image. The angle of the onboard camera 20 corresponds to the angle of the onboard camera 20 along the perpendicular direction of the lens of the onboard camera 20 (rotational angle), the angle in the perpendicular direction of the onboard camera 20 (depression angle) and the angle in the horizontal direction of the onboard camera 20 (azimuth angle). Therefore, the angle for correcting the onboard camera 20 comprises a rotational angle (roll angle) for correcting the angle of the onboard camera 20 along the perpendicular direction of the lens of the onboard camera 20, a depression angle (tilt angle) for correcting the angle of the onboard camera 20 long the perpendicular direction of the onboard camera 20 and an azimuth angle (pan angle) for correcting the angle in the horizontal direction of the onboard camera 20. With use of the correction camera angle, each angle of the onboard camera 20 can be corrected. That is, the photographic image photographed by the onboard camera 20 will be rotated along the roll angle (face rotation) and the photographic image rotated with this roll angle is adjusted in its depression angle according to the tilt angle and then angle in the horizontal direction is adjusted in accordance with this tilt angle. The correction of the photographic image makes possible not only precision superposing of the predetermined rendering image on the photographic image as described above, but also restriction of irregularities in photographic range for each actual product. In these ways, with the inventive calibration apparatus 200, by the calibration method comprising the above-described respective steps using the calibration indices 10 of the present invention, any displacement or error in the optical axis which may be present at the time of mounting of the onboard camera 20 in the vehicle 100 may be appropriately calibrated (corrected) as well.

Further, as a possible application other than that for correction of a predetermined rendering image described above, with using the rotational angle, the depression angle and the azimuth angle for correcting the angle of the onboard camera 20, the photographic image obtained by the onboard camera 20 by itself can be corrected to be displayed on the display 25. Further alternatively, the position of a displayed object (e.g. a vehicle traveling line, a physical object, etc.) included in the photographic image obtained by the onboard camera 20 may be corrected with using the rotational angle, the depression angle and the azimuth angle for correcting the angle of the onboard camera 20, for use in precision identification of position.

Other Embodiments

Figure 4:
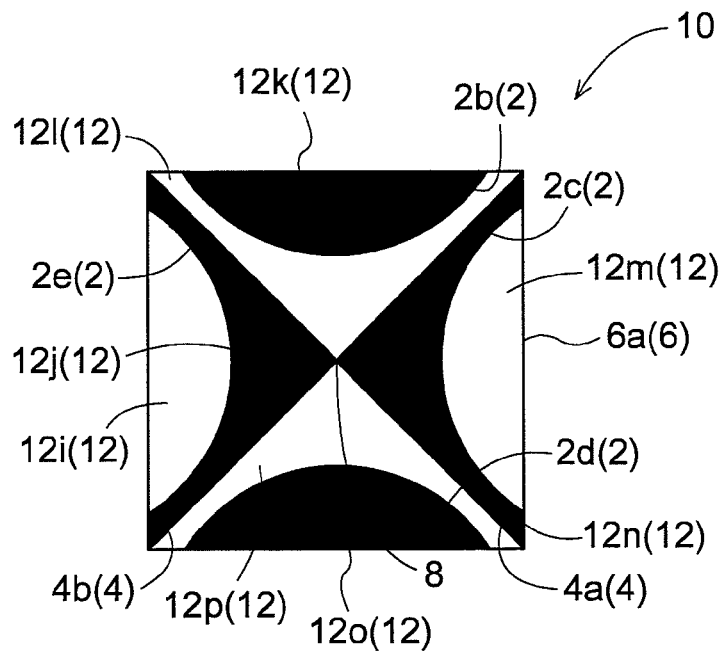

In the foregoing embodiment, the curved graphic 2 comprises the circle 2a and the linear graphic 4 comprises two straight lines 4a, 4b. However, the present invention is not limited thereto. The curved graphic 2 can be any other graphic than the circle 2a. And, the linear graphic 4 can comprise at least two straight lines, i.e. three or more straight lines. For instance, FIG. 4 shows an example of calibration index 10 using a graphic other than the circle 2a as the curved graphic 2. The curved graphic 2 can comprise curved lines 2b-2e which are formed convex relative to the center of the contour graphic 6 of the quadrangle 6a. In FIG. 4, the linear graphic 4 comprises two straight lines 4a, 4b. And, the curved lines 2b-2e and the straight lines 4a, 4b are formed in a common plane and segments 12i-12p separated by these are colored in a checkered pattern, thereby to constitute a calibration index 10. In the case of using this calibration index 10 too, an intersection point 8 formed by the two straight lines 4a, 4b within the region surrounded by the curved graphic 2 can be used as a calibration point for calibrating the onboard camera 20.

In this way, the language "the region surrounded by the curved graphic 2" means not only a region completely closed by the curved graphic 2, but also a region not completely closed by the curved graphic 2 as shown in FIG. 4. Therefore, the calibration index 10 shown in FIG. 4 too is encompassed within the inventive concept of "a curved graphic formed of a curved line surrounding a predetermined region and a linear graphic comprising two straight lines forming an intersection point within the region surrounded by the curved graphic, said curved graphic and said linear graphic being formed in a same plane" as a matter of course. Incidentally, with the calibration index 10 shown in FIG. 4, it may be considered that e.g. the curved graphic 2 and the contour graphic 6 together form a completely closed region.

Figure 5:
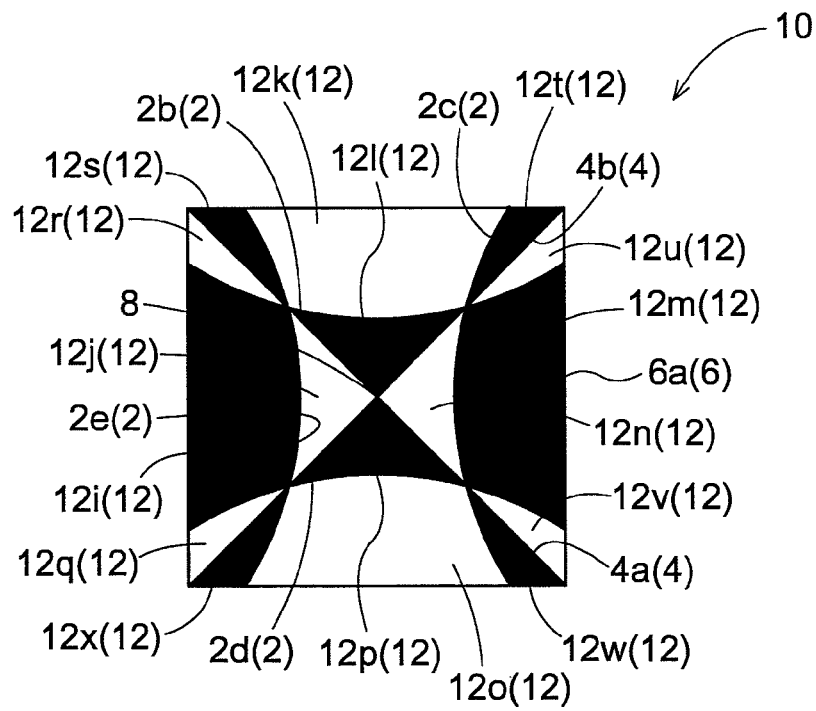

Further, as still another example of the calibration index 10, the index can be constructed as shown in FIG. 5. Like the calibration index 10 shown in FIG. 5, a closed region may be formed by a plurality of curved graphics 2. Therefore, the calibration index 10 shown in FIG. 5 too is encompassed within the inventive concept of "a curved graphic formed of a curved line surrounding a predetermined region and a linear graphic comprising two straight lines forming an intersection point within the region surrounded by the curved graphic, said curved graphic and said linear graphic being formed in a same plane" as a matter of course.

In the foregoing embodiment, especially in FIG. 1, there was shown the arrangement wherein the intersection point 8 is disposed at the center of the circle 2a. However, the scope of the present invention is not limited thereto. The disposing position of the intersection point 8 in FIG. 1 is just an example. It is needless to say that the calibration index 10 can be formed with disposing the intersection point 8 at a position, other than the center of the circle 2a (a position off the center).

Figure 6:
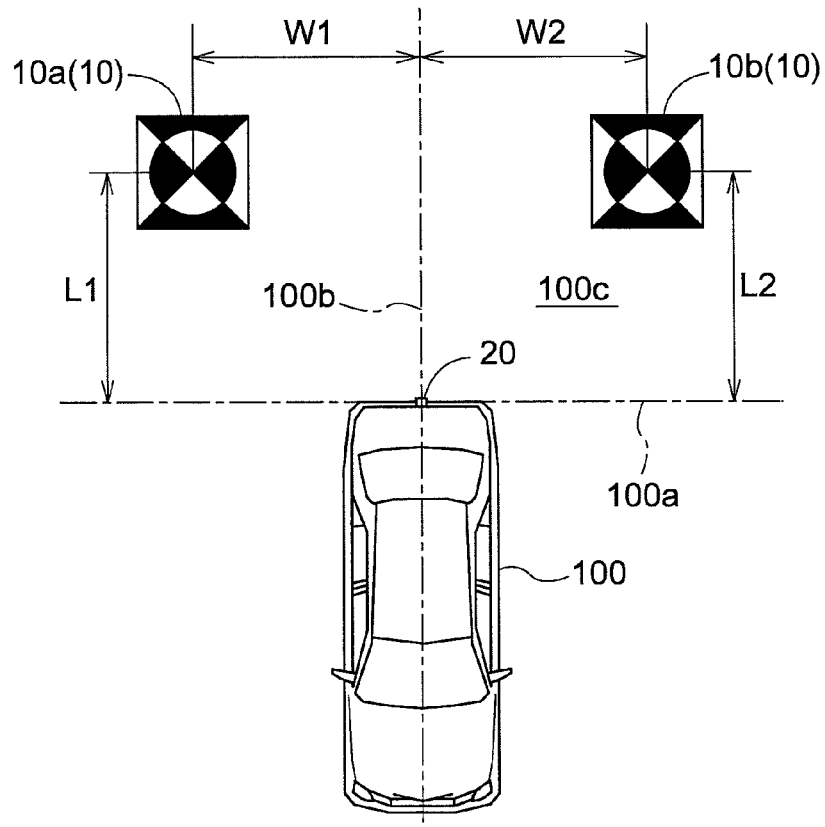

In the foregoing embodiment, it was explained that the calibration index 10 is disposed in the form of an erect panel or screen set in opposition to the vehicle 100 as illustrated in FIG. 2. However, the scope of the application of the present invention is not limited thereto. As shown in FIG. 6, the calibration indices 10 may be placed on the floor surface 100c on which the vehicle 100 is parked or the indices may be painted on the floor surface 100c. As long as the onboard camera 20 as the target of calibration, can photograph the calibration index 10, the calibration of the onboard camera 20 is possible, as a matter of course.

In the foregoing embodiment, the distortion correcting operation was explained as an operation for correcting distortion of the edge dot group present within the region surrounded by the curved graphic 2 detected by the step of detecting an edge as the detection target of the linear graphic. However, the scope of the application of the present invention is not limited thereto. Needless to say, a distortion correcting operation can be effected on the entire face of the photographic image (raw photographic image) immediately after being photographed by the onboard camera 20.

In the foregoing embodiment, it was explained that the curved graphic 2 and the linear graphics 4 are surrounded by the contour graphic 6 comprising the quadrangle 6a. However, the scope of the application of the present invention is not limited thereto. The contour graphic 6 is not limited to the quadrangle 6a, but can be any other shape such as a circle, a polygon, etc, as a matter of course. Further, needless to say, an arrangement of the contour graphic 6 not surrounding the peripheries of the curved graphic 2 and the linear graphics 4 is also possible. And, with such calibration index 10 used for such calibration too, the calibration of the onboard camera 20 can be suitably made, as a matter of course.

Figure 7:
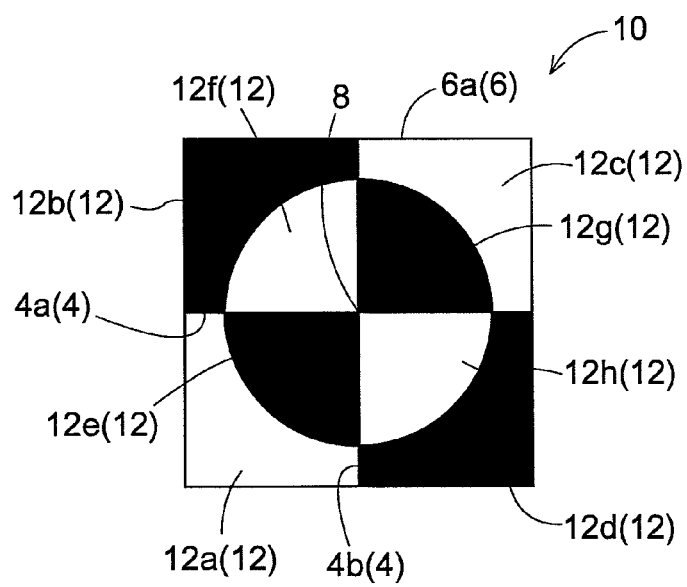

In the foregoing embodiment, the arrangement was explained in which the straight lines 4a, 4b forming the linear graphic 4 are provided with angle relative to the horizontal plane of the field of view of the onboard camera 20 and the vertical plane vertical to the horizontal plane and the two straight lines 4a, 4b have the angle of approximately 45 degrees relative to the horizontal plane and the vertical plane and intersect with each other perpendicularly. However, the scope of the application of the present invention is not limited thereto. As shown in FIG. 7, the straight lines 4a, 4b can respectively be disposed along the horizontal plane and the vertical plane. Further alternatively, though not shown, the two straight lines 4a, 4b need not extend perpendicular to each other, as long as they form an intersection point 8. And, with such calibration index 10 too, the calibration of the onboard camera 20 can be suitably made, as a matter of course.

In the foregoing embodiment, it was explained that a distortion correcting operation is effected for correcting distortion in the photographic image. However, the scope of the application of the present invention is not limited thereto. The distortion correcting operation can be omitted as a matter of course. In such case, advantageously, the detection of the linear graphic 4 using the RANSAC technique is effected with taking such distortion into consideration. Further, in the foregoing embodiment, it was explained that the distortion correcting operation is effected prior to the linear graphic detecting step. However, this can be effected instead, prior to the edge detecting step or prior to the curved graphic detecting step, as a matter of course.

In the foregoing embodiment, it was explained that the onboard camera 20 as the target of calibration is a back (rear view) camera mounted at a rear portion of the vehicle 100. However, the scope of the application of the present invention is not limited thereto. It is also possible as a matter of course to use a front (front view) camera for photographing a view forwardly of the vehicle 100 or a side (side view) camera for photographing a view laterally of the vehicle 100 as the target of calibration.

In the foregoing embodiment, it was explained that at the linear graphic detecting step, detection is made for the two straight lines 4a, 4b within the region surrounded by the curved graphic 2 and the intersection point of these detected straight lines 4a, 4b is set as the calibration point. However, the scope of the application of the present invention is not limited thereto. For instance, it is also possible as a matter of course to detect the curved graphic 2 and the straight lines 4a, 4b or the intersection point separately and evaluate the fitting degree of the straight lines 4a, 4b or the intersection point through comparison of disposing relationship between the curved graphic 2 ad the straight lines 4a, 4b or the intersection point. That is, according to such alternatively possible arrangement, at the curved graphic detecting step, the curved graphic 2 is detected based on an edge which was detected by the edge detecting step, whereas, at the linear graphic detecting step, the linear graphic 4 is detected and at the calibration point setting step, if the linear graphics 4 (their intersection point) detected by the linear graphic detecting step is present within the region surrounded by the curved graphic 2 detected by the curved graphic detecting step, this is set as the calibration point.

Further, it is also possible to adopt an arrangement wherein the straight lines 4a, 4b are detected by the linear graphic detecting step and after detection of the intersection point of these straight lines 4a, 4b and then, the curved graphic 2 around this intersection point is detected. That is, in the case of the alternative arrangement wherein only when a curved graphic 2 is detected around the detected intersection point at the calibration point setting step, this intersection point is set as the calibration point. In the case of this alternative arrangement too, the advantageous same effect to that described above can be obtained.

In the foregoing embodiment, it was explained that at the correction camera parameter calculating step, calculations are made for calculating the angle of the onboard camera 20 along the perpendicular direction of the lens of the onboard camera 20 (roll angle), the angle in the perpendicular direction of the onboard camera 20 (depression angle) and the azimuth angle in the horizontal direction of the onboard camera 20 (pan angle). However, the scope of the application of the present invention is not limited thereto. It is also possible as a matter of course, to calculate, as the external parameters of the onboard camera 20, translational movement amounts of the onboard camera 20 (physical displacements of the onboard camera 20 in the horizontal, vertical and depth direction).

In the foregoing embodiment, there were explained the calibration index 10 for use in calibration of the onboard camera 20, a calibration method for the onboard camera 20 with using the calibration index 10 and a program for the calibration apparatus 200 using the calibration index 10. However, it is needless to say that the scope of the application of the present invention includes the calibration apparatus 200 for effecting calibration of the onboard camera 20 using the above-described calibration index 10.

That is, the calibration apparatus 200 can comprise the pair of calibration indices 10 disposed in opposition to the onboard camera 20 and spaced apart from each other, the image receiving section 40 for receiving an image photographed by the onboard camera 20 and storing it at the storing section 40a, an edge detecting section for detecting an edge included in the photographic image stored at the storing section 40a, a curved graphic detecting section for detecting the curved graphic 2 based on the detected edge, a linear graphic detecting section for detecting the linear graphics 4, a calibration point setting section for detecting an intersection point of the detected linear graphics 4 and setting this intersection point as the calibration point for use in the calibration of the onboard camera 20 base upon the intersection point and the curved graphic 2, a correction camera parameter calculating section for calculating a correction camera parameter for correcting displacement or error in the optical axis of the onboard camera 20 which occurs at the time of mounting of the camera 20 to the vehicle 100, based upon a pair of set point which correspond to a pair of calibration points which were set from the pair of calibration indices 10 and set in advance in correspondence with the mounting position of the onboard camera 20 and a pair of calibration points included in the photographic image.

In such case as above, as the calibration index 10, advantageously, it is possible as a matter of course, to employ a calibration index comprising the curved graphic 2 formed of a curved line surrounding a predetermined region and the linear graphic 4 comprising at least two straight lines that form an intersection point within the region surrounded by the curved line 2, the curved graphic 2 and the linear graphic 4 being formed in a common plane, and segments separated by the curved line forming the curved graphic 2 and the straight lines 4a, 4b forming the linear graphic 4 are colored in a checkered pattern.

INDUSTRIAL APPLICABILITY

The present invention can be used as a calibration index (marker) free of erroneous detection for use in calibration of an onboard camera and a calibration method of onboard camera using such calibration index.

DESCRIPTION OF REFERENCE MARKS

2: curved graphic
2e: circle
4: linear graphic
4a, 4b: straight lines
6: contour graphic
6a: quadrangle
8: intersection point
10: calibration index 12: segment
12a-12h: segments

The invention claimed is:

1. A calibration index for calibrating an onboard camera, comprising:
a curved graphic formed of a curved line surrounding a predetermined region;
a linear graphic comprising at least two straight lines forming an intersection point within said region surrounded by the curved graphic,
said curved graphic and said linear graphic being formed in a same plane;
the straight lines forming the linear graphic being provided with an inclination relative the horizontal plane in the field of view of the onboard camera and a vertical plane vertical relative to said horizontal plane; and
a plurality of segments separated by the curved line forming the curved graphic and the straight lines forming the linear graphic being colored in a checkered pattern.

2. The calibration index according to claim 1, wherein said curved graphic and said linear graphic each is surrounded by a further graphic having a different contour.

3. The calibration index according to claim 2, wherein said two straight lines have an angle of approximately 45 degrees relative to said horizontal plane and said vertical plane and formed perpendicular to each other.

4. A method of calibrating an onboard camera, comprising the steps of:
providing a pair of the calibration index according to claim 3;
photographing the pair of calibration indices with the onboard camera, said calibration indices being disposed in a pair spaced apart from each other and in opposition to the onboard camera;
detecting an intersection point from the photographic image obtained by said photographing step and including said calibration indices and setting the detected intersection point as a calibration point; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

5. A method of calibrating an onboard camera, comprising the steps of:
providing a pair of the calibration index according to claim 3;
photographing a pair of calibration indices according to claim 3 with the onboard camera, said calibration indices being disposed in a pair spaced apart from each other and in opposition to the onboard camera;
detecting an intersection point from the photographic image obtained by said photographing and including said calibration indices and setting the detected intersection point as a calibration point; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

6. A method of calibrating an onboard camera, the method comprising
providing a pair of the calibration index according to claim 3;
photographing a pair of calibration indices according to claim 3 with an onboard camera, said calibration indices being disposed in a pair spaced apart from each other and in opposition to the onboard camera;
receiving a resultant photographic image obtained by the photographing step and storing this image at a storing section;
detecting an edge included in the photographic image stored at said storing section;
detecting the curved graphic based on the detected edge;
detecting the linear graphic;
detecting an intersection point in the detected linear graphic and setting said intersection point as a calibration point for use in the calibration of the onboard camera, based upon said intersection point and said curved graphic; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

7. A method of calibrating an onboard camera, comprising the steps of:
providing a pair of the calibration index according to claim 2;
photographing the pair of calibration indices with the onboard camera, said calibration indices being disposed in a pair spaced apart from each other and in opposition to the onboard camera;
detecting an intersection point from the photographic image obtained by said photographing and including said calibration indices and setting the detected intersection point as a calibration point; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

8. A method of calibrating an onboard camera, comprising the steps of:
providing a pair of the calibration index according to claim 2;
photographing the pair of calibration indices with the onboard camera, said calibration indices being disposed in a pair spaced apart from each other and in opposition to the onboard camera;
detecting an intersection point from the photographic image obtained by said photographing and including said calibration indices and setting the detected intersection point as a calibration point; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

9. A method of calibrating an onboard camera, the method comprising
providing a pair of the calibration index according to claim 2;

photographing the a pair of calibration indices with an onboard camera, said calibration indices being disposed in a pair spaced apart from each other and in opposition to the onboard camera;
receiving a resultant photographic image obtained by the photographing step and storing this image at a storing section;
detecting an edge included in the photographic image stored at said storing section;
detecting the curved graphic based on the detected edge;
detecting the linear graphic;
detecting an intersection point in the detected linear graphic and setting said intersection point as a calibration point for use in the calibration of the onboard camera, based upon said intersection point and said curved graphic; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

10. The calibration index according to claim 1, wherein said two straight lines have an angle of approximately 45 degrees relative to said horizontal plane and said vertical plane and formed perpendicular to each other.

11. A method of calibrating an onboard camera, comprising the steps of:
providing a pair of the calibration index according to claim 10;
photographing the pair of calibration indices with the onboard camera, said calibration indices being disposed in a pair spaced apart from each other and in opposition to the onboard camera;
detecting an intersection point from the photographic image obtained by said photographing and including said calibration indices and setting the detected intersection point as a calibration point; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

12. A method of calibrating an onboard camera, comprising the steps of:
providing a pair of the calibration index according to claim 10;
photographing the pair of calibration indices with the onboard camera, said calibration indices being disposed in a pair spaced apart from each other and in opposition to the onboard camera;
detecting an intersection point from the photographic image obtained by said photographing and including said calibration indices and setting the detected intersection point as a calibration point; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

13. A method of calibrating an onboard camera, the method comprising providing a pair of the calibration index according to claim 10;
photographing the pair of calibration indices with an onboard camera, said calibration indices being disposed in a pair spaced apart from each other and in opposition to the onboard camera;
receiving a resultant photographic image obtained by the photographing step and storing this image at a storing section;
detecting an edge included in the photographic image stored at said storing section;
detecting the curved graphic based on the detected edge;
detecting the linear graphic;
detecting an intersection point in the detected linear graphic and setting said intersection point as a calibration point for use in the calibration of the onboard camera, based upon said intersection point and said curved graphic; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

14. A method of calibrating an onboard camera, the method comprising:
providing a pair of the calibration index according to claim 1;
photographing the pair of calibration indices with the onboard camera; and
detecting an intersection point from the photographic image obtained by said photographing and including said calibration indices and setting the detected intersection point as a calibration point.

15. A calibration apparatus for calibrating an onboard camera, comprising:
the calibration index according to claim 1;
an image obtaining section for obtaining image of the calibration index with the onboard camera; and
a calibration point identifying section for detecting an intersection point from the photographic image obtained by said photographing and including said calibration indices.

16. A method of calibrating an onboard camera, comprising the steps of:
providing a pair of the calibration index according to claim 1;
photographing the pair of calibration indices with the onboard camera, said calibration indices being disposed in a pair spaced apart from each other and in opposition to the onboard camera;
detecting an intersection point from the photographic image obtained by said photographing and including said calibration indices and setting the detected intersection point as a calibration point; and
correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

17. A method of calibrating an onboard camera, the method comprising
photographing a pair of calibration indices according to claim 1 with an onboard camera, said calibration indices being disposed in a pair spaced apart from each other and in opposition to the onboard camera;

receiving a resultant photographic image obtained by the photographing step and storing this image at a storing section;

detecting an edge included in the photographic image stored at said storing section;

detecting the curved graphic based on the detected edge;

detecting the linear graphic;

detecting an intersection point in the detected linear graphic and setting said intersection point as a calibration point for use in the calibration of the onboard camera, based upon said intersection point and said curved graphic; and correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

18. A non-transitory computer readable medium including a program for calibrating an onboard camera, the program comprising:

photographing a pair of calibration indices with the onboard camera, said calibration indices being disposed in a pair spaced apart from each other and in opposition to the onboard camera;

detecting an intersection point from the photographic image obtained by said photographing and including said calibration indices and setting the detected intersection point as a calibration point; and correcting a displacement or an error in the optical axis present when the onboard camera was mounted on a vehicle, based upon a pair of set points which correspond respectively to a pair of calibration points set from the pair of calibration indices and which are set in advance in correspondence with the mounting position of the onboard camera.

19. A non-transitory computer readable medium including a program for use in a calibration apparatus for effecting calibration of an onboard camera, the program comprising computer-executed functions of:

photographing a pair of calibration indices with an onboard camera, said calibration indices being disposed in a pair spaced apart from each other and in opposition to the onboard camera;

receiving resultant photographic image obtained by the photographing function and storing this image at a storing section;

detecting an edge included in the photographic image stored at said storing section;

detecting the curved graphic based on the detected edge;

detecting the linear graphic;

detecting an intersection point in the detected linear graphic and setting said intersection point as a calibration point for use in the calibration of the onboard camera, based upon said intersection point and said curved graphic; and correcting a displacement in the optical axis if any present when the onboard camera was mounted on a vehicle, based upon a pair of set points which correspond respectively to a pair of calibration points set from the pair of calibration indices and which are set in advance in correspondence with the mounting position of the onboard camera.

* * * * *